(12) United States Patent
Katata et al.

(10) Patent No.: US 8,154,958 B2
(45) Date of Patent: Apr. 10, 2012

(54) RECORDING APPARATUS USING CONTROL INFORMATION AND VIRTUAL REFERENCE INFORMATION

(75) Inventors: Keiji Katata, Saitama (JP); Akihito Kajita, Saitama (JP); Kazuki Sakai, Saitama (JP); Kimio Matsusaka, Saitama (JP); Motoyasu Aoki, Saitama (JP); Kenichi Enoki, Saitama (JP)

(73) Assignee: Pioneer Corporation, Tokyo (JP)

( * ) Notice: Subject to any disclaimer, the term of this patent is extended or adjusted under 35 U.S.C. 154(b) by 889 days.

(21) Appl. No.: 12/091,850

(22) PCT Filed: Oct. 27, 2006

(86) PCT No.: PCT/JP2006/321496
§ 371 (c)(1),
(2), (4) Date: Sep. 3, 2008

(87) PCT Pub. No.: WO2007/049742
PCT Pub. Date: May 3, 2007

(65) Prior Publication Data
US 2009/0129250 A1    May 21, 2009

(30) Foreign Application Priority Data
Oct. 27, 2005  (JP) .................................. 2005-313558

(51) Int. Cl.
*G11B 21/08* (2006.01)
(52) U.S. Cl. .................................................. 369/30.18
(58) Field of Classification Search ............... 369/30.18, 369/275.3, 275.2, 275.1, 275.4, 53.2, 53.41, 369/47.1
See application file for complete search history.

(56) References Cited

U.S. PATENT DOCUMENTS

| | | | | |
|---|---|---|---|---|
| 7,630,284 B2 * | 12/2009 | Takashima et al. | .......... | 369/53.2 |
| 7,768,892 B2 * | 8/2010 | Nakamura et al. | .......... | 369/59.25 |
| 7,859,958 B2 * | 12/2010 | Takashima et al. | ........ | 369/47.13 |
| 7,936,651 B2 * | 5/2011 | Takashima | ................. | 369/53.17 |
| 2007/0242587 A1 * | 10/2007 | Katata et al. | ............... | 369/59.25 |
| 2008/0198732 A1 * | 8/2008 | Maeda et al. | ............. | 369/275.3 |
| 2009/0116349 A1 * | 5/2009 | Takashima | ................... | 369/47.1 |

FOREIGN PATENT DOCUMENTS

| | | | |
|---|---|---|---|
| JP | 2000-503446 | | 3/2000 |
| JP | 2001-023237 | | 1/2001 |
| JP | 2002-150706 | | 5/2002 |
| JP | 2002-269746 | | 9/2002 |
| JP | 2003-168265 | | 6/2003 |
| JP | 2004-030232 | | 1/2004 |
| JP | 2008123473 A | * | 5/2008 |

* cited by examiner

Primary Examiner — Tan X Dinh
(74) Attorney, Agent, or Firm — Young & Thompson

(57) ABSTRACT

An information recording apparatus includes a first acquiring element that acquires both control information for controlling the order of recording or reproducing recorded information and virtual reference information that can be determined by the control information and by an address indicative of the position of a recording area in which the recorded information is recorded, a first converting element that converts the acquired control information and virtual reference information to first control information, a recording element that at least records the recorded information, a first control element that controls the recording element to record the converted first control information, a second acquiring element that acquires the recorded first control information, a second converting element that converts the acquired first control information to second control information having different attributes, and a second control element that controls the recording element to record the converted second control information.

9 Claims, 14 Drawing Sheets

[FIG. 1]
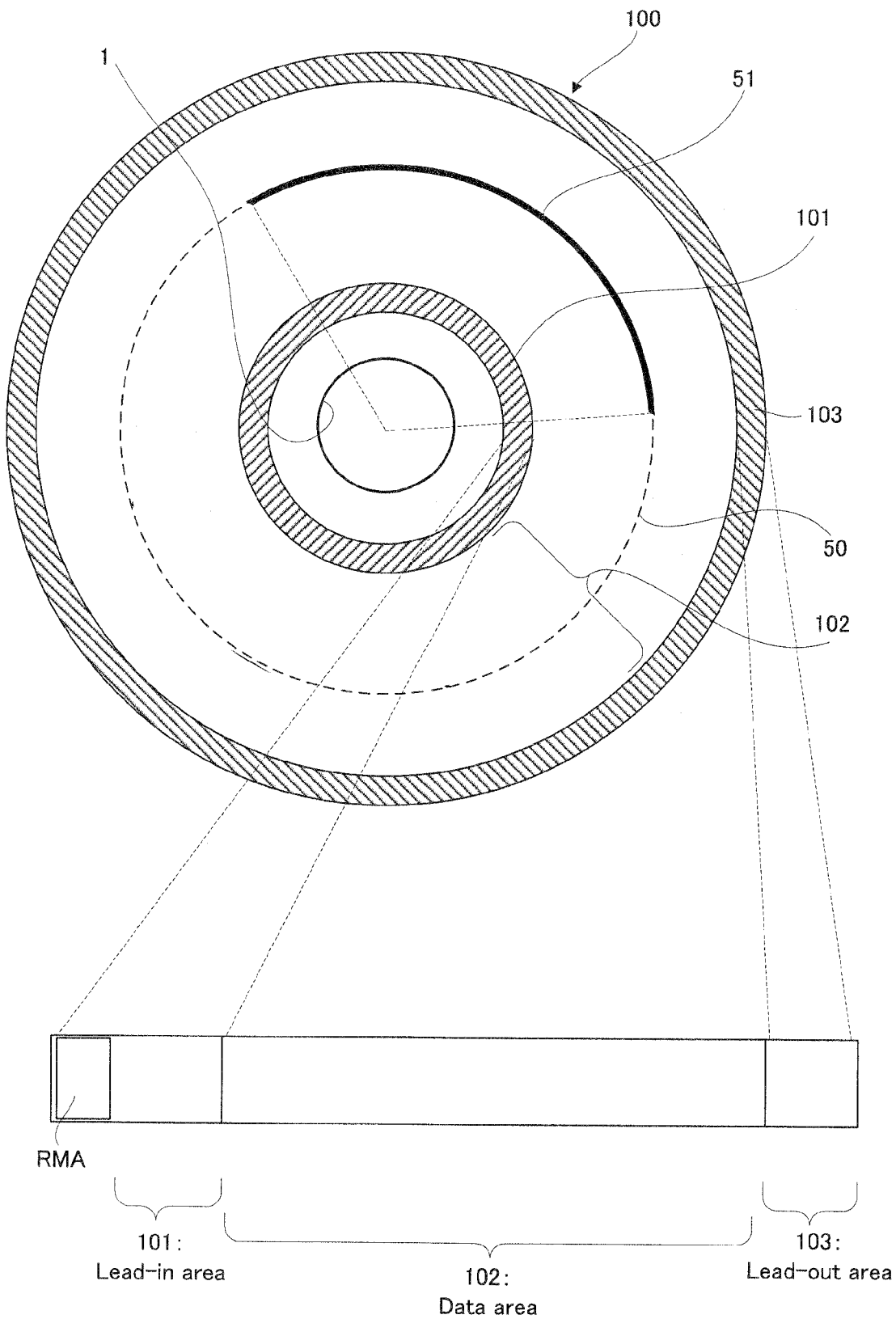

[FIG. 2]
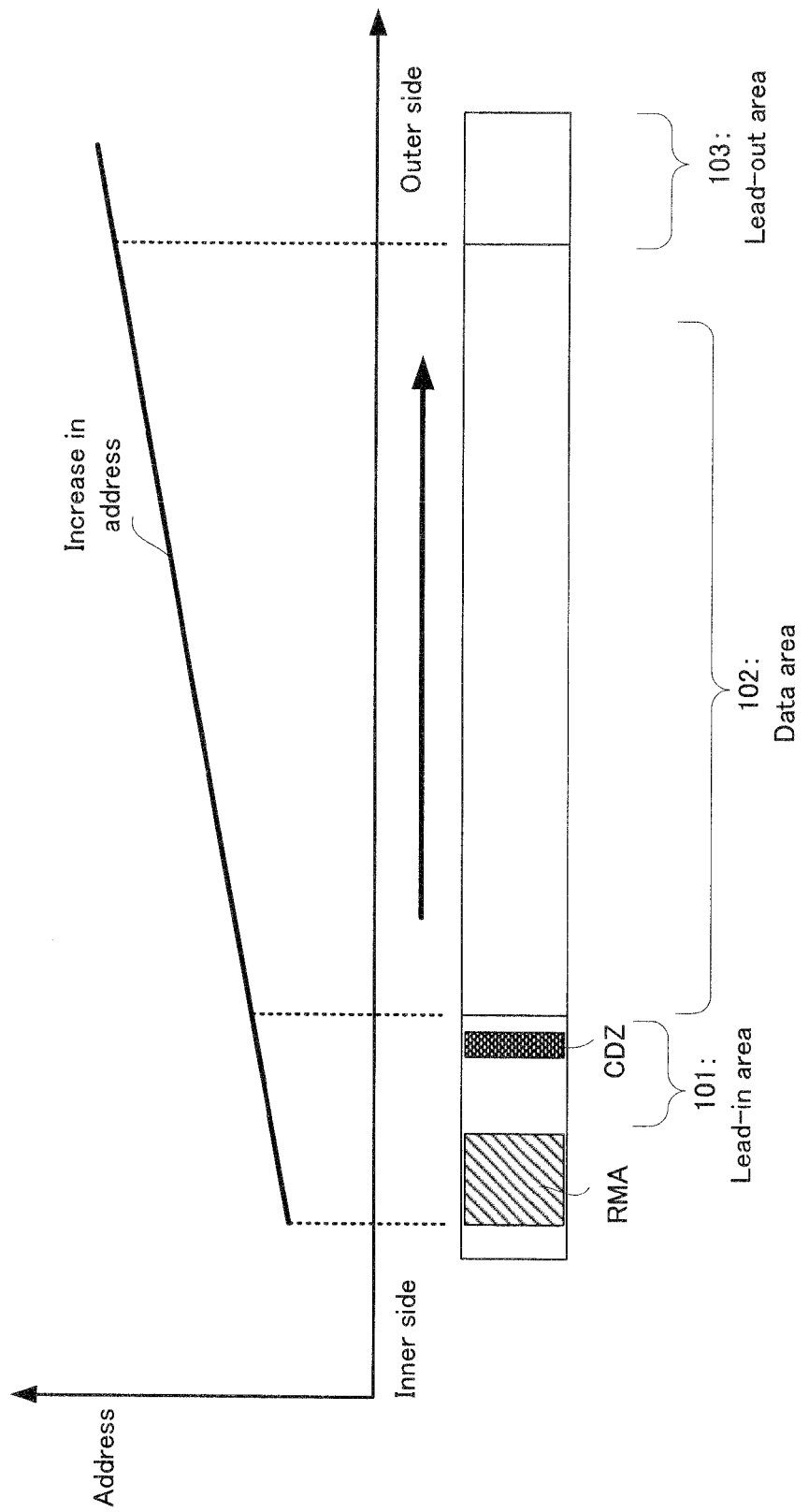

[FIG. 3]
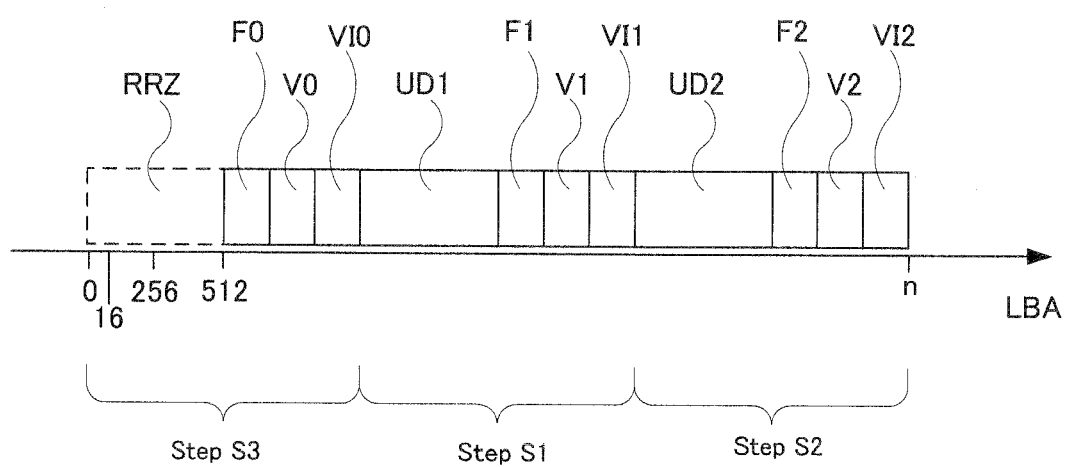

[FIG. 4]
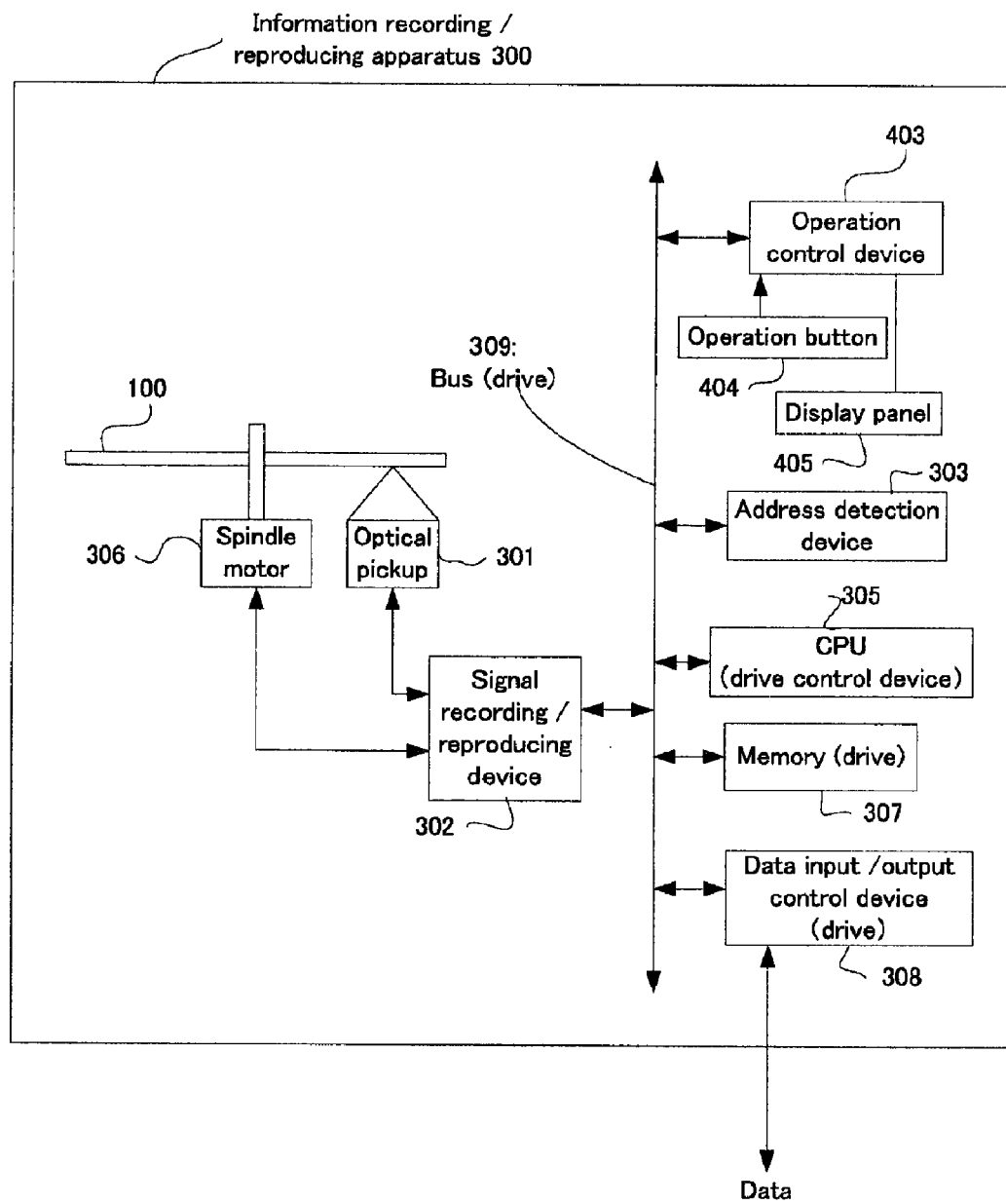

[FIG. 5]
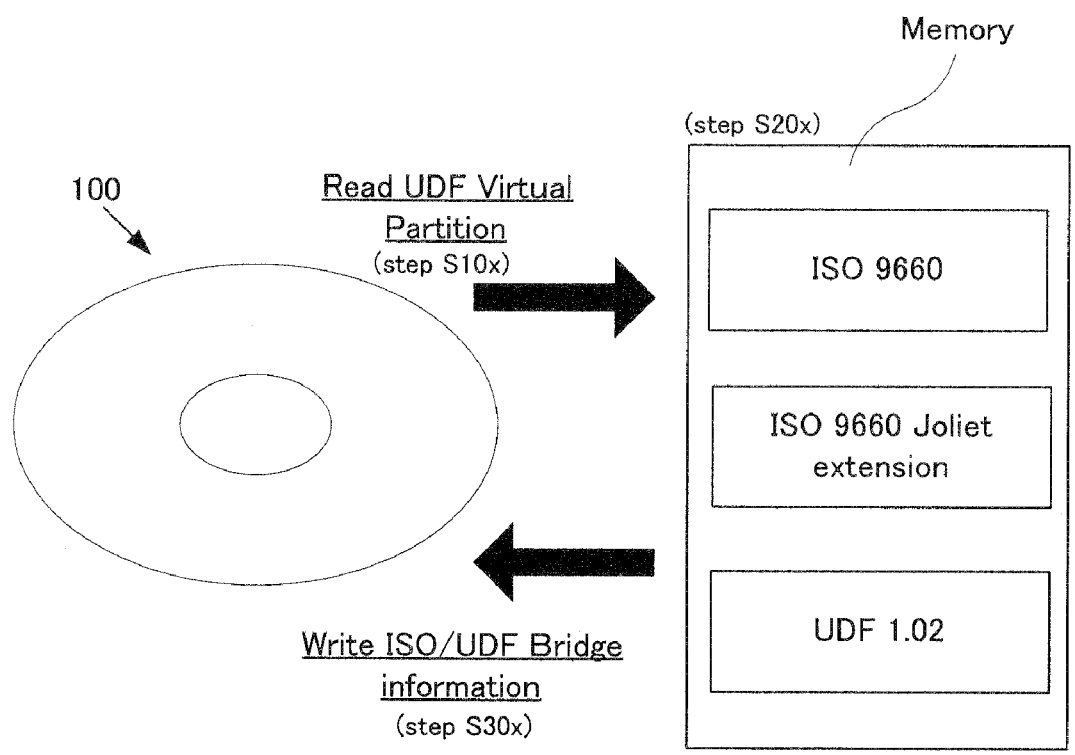

[FIG. 6]

| Type of file system | Character code | The number of characters (the number of bytes) |
|---|---|---|
| UDF Virtual Partition | Unicode | 127(255) |
| UDF 1.02 | | |
| ISO 9660 Joliet extension | | 64(128) |
| ISO 9660 | Shift JIS | 15(31) |

[FIG. 7]
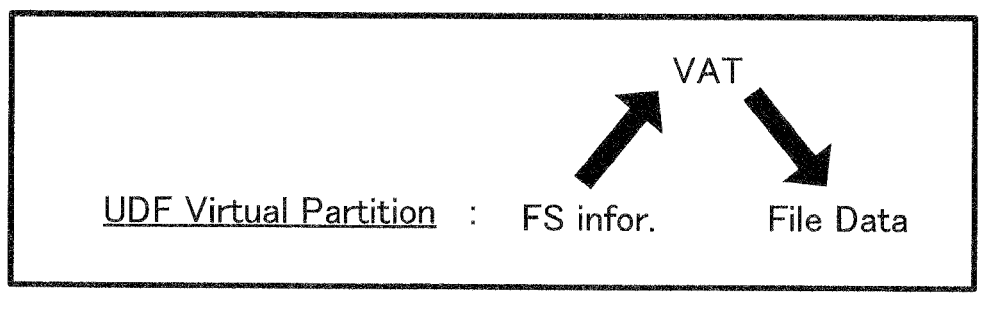
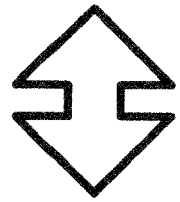
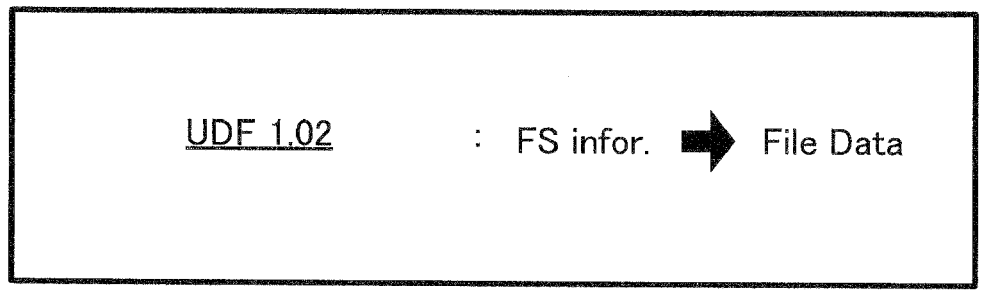

[FIG. 8]
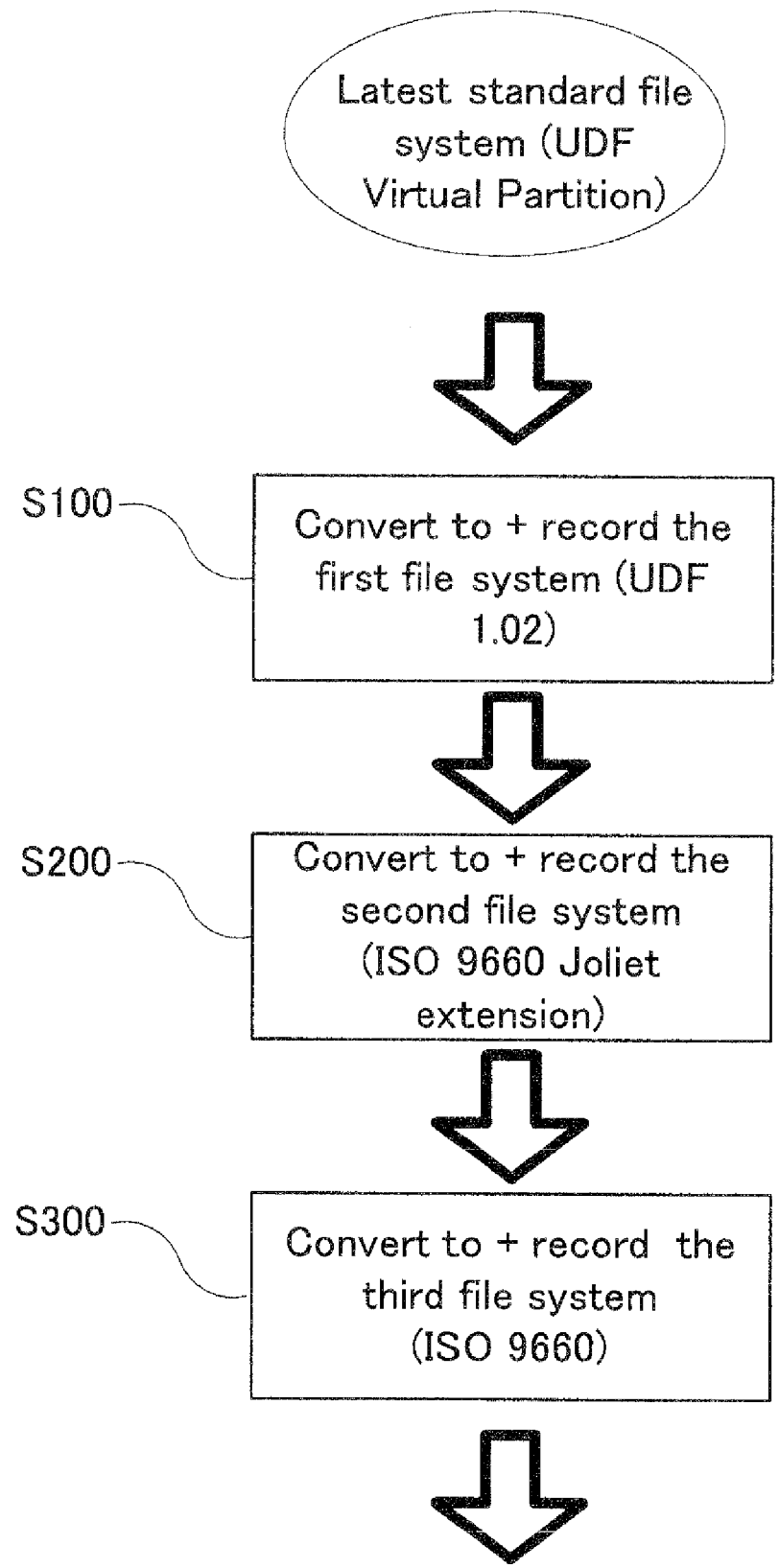

[FIG. 9]
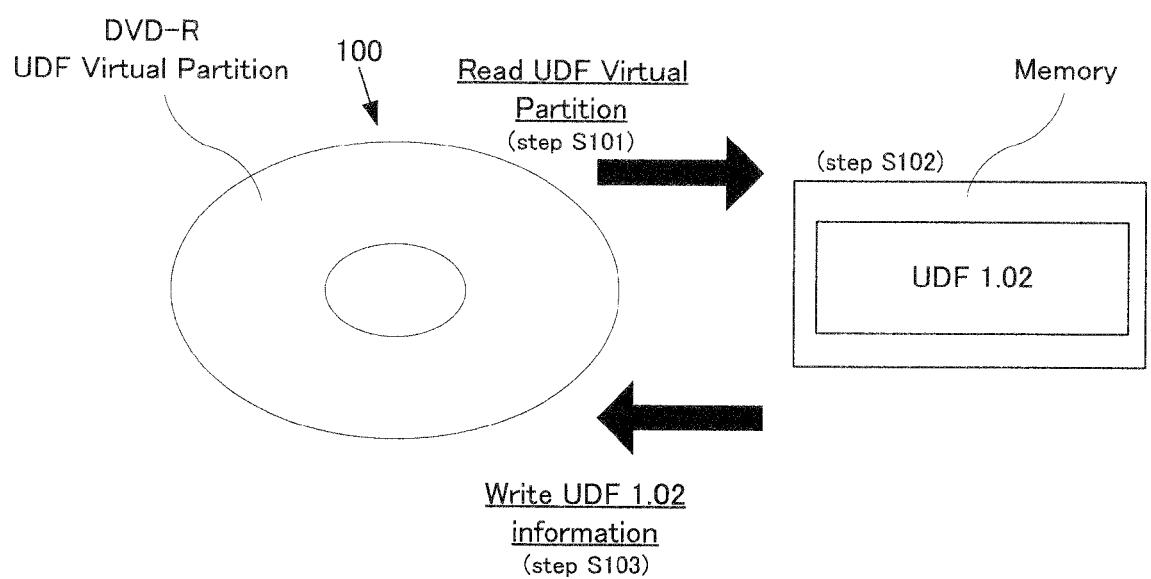

[FIG. 10]
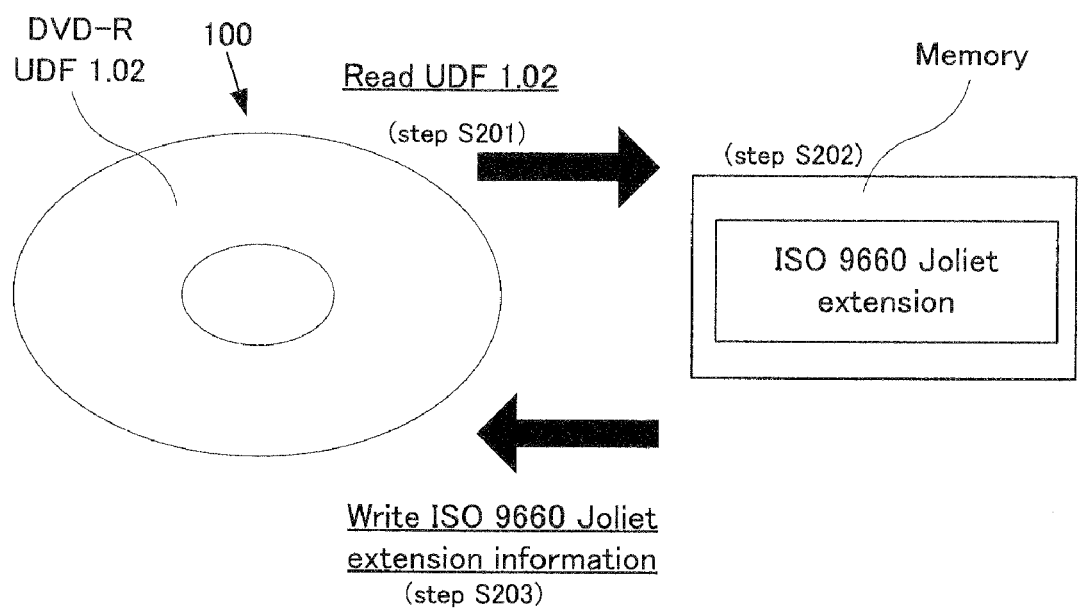

[FIG. 11]
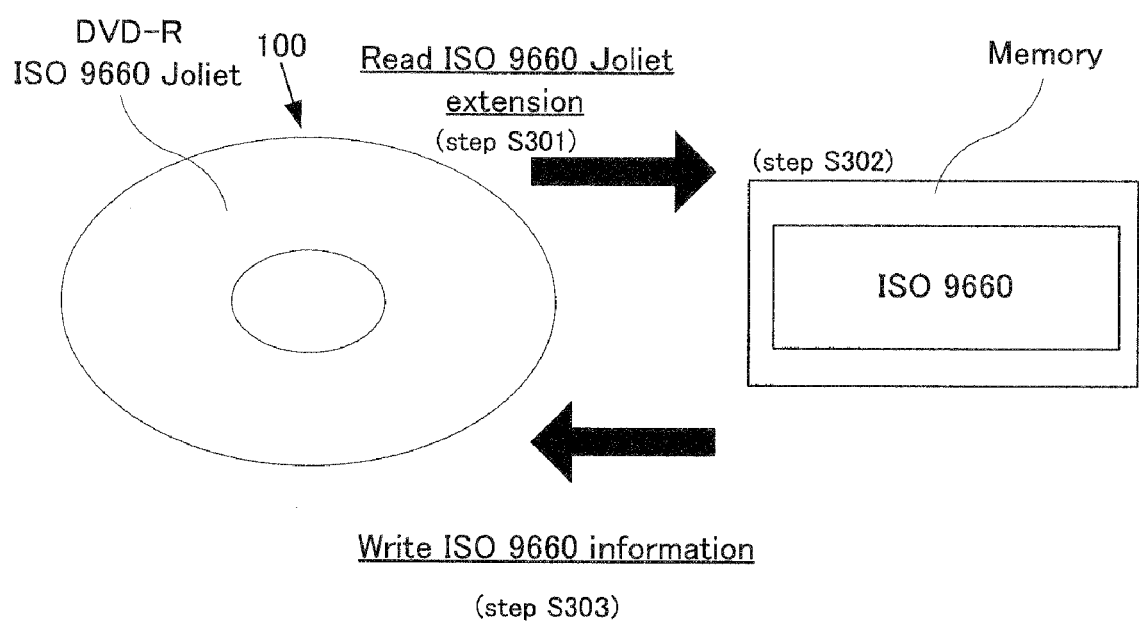

[FIG. 12]
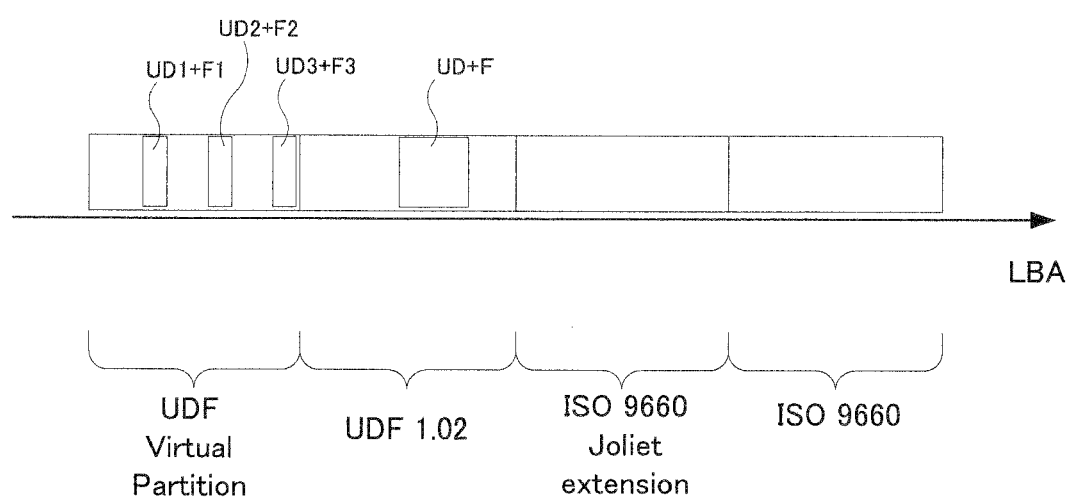

[FIG. 13]
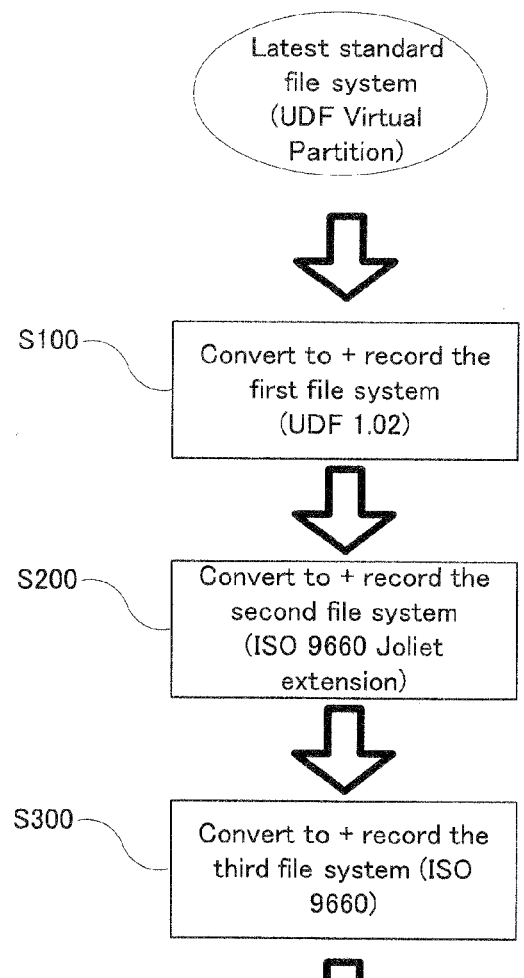
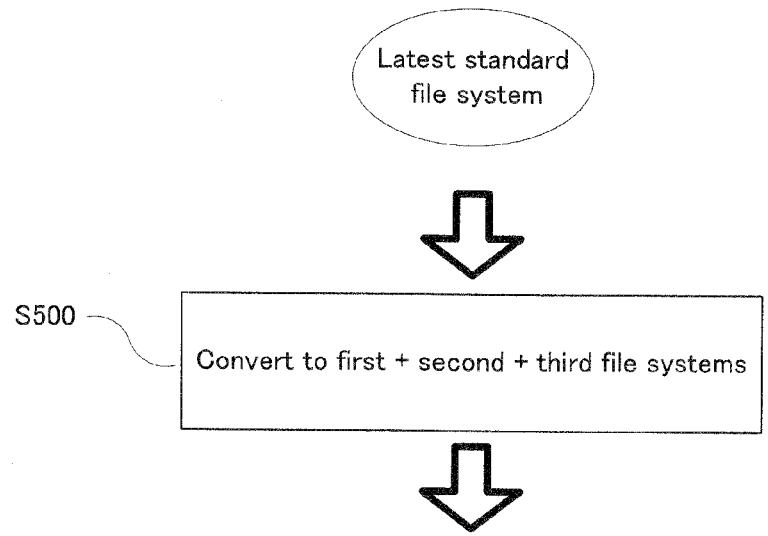

[FIG. 14]
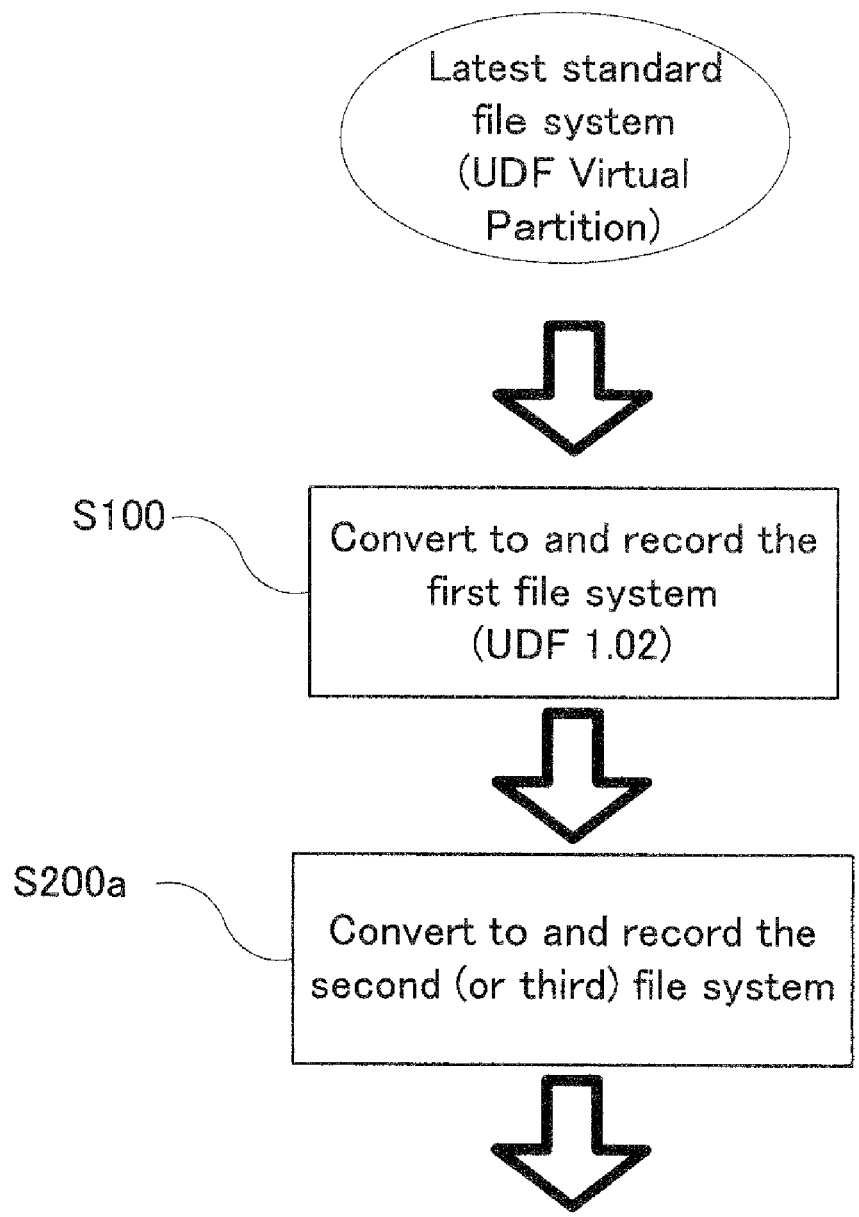

US 8,154,958 B2

RECORDING APPARATUS USING CONTROL INFORMATION AND VIRTUAL REFERENCE INFORMATION

TECHNICAL FIELD

The present invention relates to an information recording apparatus and method, such as a DVD recorder, and a computer program which makes a computer function as the information recording apparatus.

BACKGROUND ART

In a recording type information recording medium, such as a CD-R (Compact Disc-Recordable), a DVD-R, a DVD-RW, and a DVD+R, what is general is an information recording medium, such as an optical disc, on which a recording layer is laminated or bonded on a substrate. Moreover, on an information recording apparatus, such as a DVD recorder, which performs recording on such an optical disc, laser light for recording is focused on the recording layer, to thereby record information in an irreversible change recording method by heat or the like, or in a rewritable method by phase change or the like.

Moreover, as a method of managing data recorded on the recording type information recording medium (e.g. a method of specifying the recording position of the data or the like), a file system is generally used. For example, in a DVD, UDF (Universal Disk Format) is defined as the standard file system. In particular, in write-once type media (write once disc), such as e.g. a DVD-R, on which writing is allowed only once, there is a method of managing a file on the basis of UDF VP (UDF Virtual Partition) using so-called VAT (Virtual Allocation Table). The management method using the VAT is used mainly in rewriting file system information about a file recorded on a write-once type optical disc.

On the other hand, in the latest personal computer using Windows XP (registered mark), which is the latest standard OS (Operation System), UDF VAT and UDF VP can be recognized and read. On the other hand, electronic equipment which is widely distributed in the market, such as an old version of Windows (registered mark), MAC OS (registered mark), a commercially available DVD player, portable DVD CE (Compact Edition) equipment, and on-vehicle DVD equipment, does not correspond to UDF VAT and UDF VP, so that the electronic equipment cannot read them.

Thus, the electronic equipment (a DVD Video Recorder) that performs recording on the write-once type media, such as a DVD-R, or the like prepares a compatible file system, such as ISO/UDF Bridge file system, which has compatibility with read-only media, such as a CD-ROM and a DVD-ROM, by conversion from the latest standard file system, such as UDF Virtual Partition, and records it onto the write-once type media. As a result, even in the aforementioned electronic equipment which is widely distributed in the market, the compatibility can be ensured to perform the reproduction of the write-once type media. Incidentally, in the present invention, converting the file system, such as UDF Virtual Partition, to the compatible file system, such as ISO/UDF Bridge file system, is referred to as "providing compatibility" or "performing a compatibility process", as occasion demands, wherein the compatible file system is provided with a plurality of file systems, such as ISO 9660 file system, ISO 9660 Joliet extension file system, and UDF 1.02 file system.

Patent document 1: Japanese Patent Kohyo NO. 2000-503446
Patent document 2: Japanese Patent Application Laid Open NO. 2001-23237
Patent document 3: Japanese Patent Application Laid Open NO. 2002-150706

DISCLOSURE OF INVENTION

Subject to be Solved by the Invention

However, the aforementioned conversion method requires a high-capacity of memory (a physical memory or high-speed memory). That is, in the aforementioned conversion method, all of the plurality of file systems are converted on the memory and written onto the optical disc. It is only necessary to perform the reading operation from the optical disc once, and it is also only necessary to perform the writing operation onto the optical disc once. Thus, it is possible to realize the quick conversion process. As its trade-off, the high-capacity memory is required. Specifically, for example, the memory with about 64 Mbytes to 128 Mbytes is required to convert the latest standard file system, such as UDF Virtual Partition of a DVD-R 4.7 GB, to the compatible file system, such as ISO/UDF Bridge file system, which is provided with the plurality of file systems, such as ISO 9660 file system, ISO 9660 Joliet extension file system, and UDF 1.02 file system. Thus, in Palm Top Type small-size electronic equipment or portable electronic equipment, it is technically hard to mount the high-capacity and small-size memory. In addition, if the high-capacity and small-size memory is mounted, cost will be increased. In the market, for example, if the high-capacity and small-size memory is mounted in the small-size electronic equipment or portable electronic, such as a small-size digital camera and a portable photo recorder/viewer, the mounted memory only has a recording capacity of e.g. about 16-32 Mbytes for the reasons of physical and structural restrictions or the like, such as an increase in price, an increase in power consumption for driving the high-capacity memory, and impossibility to ensure a space in which the high-capacity memory is mounted.

In view of the aforementioned problems, it is therefore an object of the present invention to provide an information recording apparatus and method, which allow the latest standard file system to be appropriately converted to the compatible file system on e.g. a write-once type information recording medium, and a computer program which makes a computer function as the information recording apparatus

Means for Solving the Subject (Information Recording Apparatus)
Hereinafter, the information recording apparatus of the present invention will be explained.

The above object of the present invention can be achieved by an information recording apparatus for performing recording on an information recording medium on which (i) control information (File System UDF-VAT) and (ii) virtual reference information (VAT) can be recorded, the control information capable of controlling order of recording or reproducing record information (contents), the virtual reference information indicating a correlation between an address (physical or logical address) that indicates a position in a recording area in which the record information is recorded and a virtual address that can be specified by the control information, the information recording apparatus provided with: a first obtaining device for obtaining the control information and the virtual reference information; a first converting device for converting the obtained control information and the obtained virtual reference information to first control information (one element of UDF Bridge: File System—UDF 1.02) which can control the order of recording or reproducing the record information on the basis of the address; a recording device for recording at least the record information; a first controlling device for controlling the recording device to record the converted first control information; a second obtaining device for obtaining the recorded first control information; a second converting device for converting the obtained first control information to second control information (another element of UDF Bridge: File System—ISO 9660 Joliet and ISO 9660) with a different attribute (the number of characters and a character code); and a second controlling device for controlling the recording device to record the converted second control information.

According to the information recording apparatus of the present invention, firstly, the control information and the virtual reference information are obtained by the first obtaining device. Then, the obtained control information, such as e.g. UDF Virtual Partition, i.e. the latest standard file system, is converted by the first converting device to the first control information, such as e.g. UDF 1.02 file system, which is one element that constitutes the compatible file system, for example, on a memory. Simultaneously or in tandem with this, the converted first control information is written onto the information recording medium by the recording device, under the control of the first controlling device.

Then, the first control information is obtained by the second obtaining device. Then, the obtained first control information, such as UDF 1.02 file system, is converted by the second converting device to the second control information, such as e.g. ISO 9660 Joliet extension file system, which is another element that constitutes the compatible file system, for example, on the same memory. Simultaneously or in tandem with this, the converted second control information is written onto the information recording medium by the recording device, under the control of the second controlling device.

The following technical problem occurs if an entire portion of the control information, such as e.g. UDF Virtual Partition, i.e. the latest standard file system, is converted at a time to another control information, such as e.g. ISO/UDF Bridge file system, i.e. the compatible file system, on the memory and is written onto the information recording medium. That is, it is only necessary to perform the reading operation from the optical disc once, and it is also only necessary to perform the writing operation onto the optical disc once. Thus, it is possible to realize the quick conversion process. However, as its trade-off, the high-capacity memory is required. Thus, in Palm Top Type small-size electronic equipment or portable electronic equipment, it is technically hard to mount the high-capacity and small-size memory. In addition, if the high-capacity and small-size memory is mounted, cost will be increased.

In contrast, according to the present invention, under the control of the controlling device, such as a CPU, the entire portion of the control information, such as e.g. UDF Virtual Partition, i.e. the latest standard file system, is converted to the first control information and the second control information by separated conversion steps, which constitute another control information, such as ISO/UDF Bridge file system, by each of the plurality of portions and in a plurality of times in order, on the memory, and simultaneously each is written onto the information recording medium. In other words, in the present invention, the file system before conversion and the file system after conversion are appropriately combined on the basis of various characteristics, such as the attribute and the data structure of various file systems, such as UDF Virtual Partition, and the conversion processes are performed in appropriate order.

As a result, it is possible to significantly reduce the capacity of the memory required in converting the entire portion of the control information, such as the latest standard file system, to the compatible file system, such as ISO/UDF Bridge file system, which is provided with the plurality of file systems, such as ISO 9660 file system, ISO 9660 Joliet extension file system, and UDF 1.02 file system, to about "one-several tenth" to "one-severalth (or a fraction)", compared to the conventional method. Therefore, it is unnecessary to mount the high-capacity and small-size memory, so that it is possible to reduce the cost of the memory to be low. In other words, even in the commercially available small-size electronic equipment, such as a small-size digital camera, equipped only with the memory with a memory capacity of about 16-32 Mbytes, it is possible to sufficiently provide compatibility for the entire latest standard file system, such as UDF Virtual Partition by the conversion of the present invention.

In one aspect of the information recording apparatus of the present invention, each of the first obtaining device and the second obtaining device is further provided with a memory device for storing the obtained information.

According to this aspect, compare to the conventional method, on the memory device, such as a memory, with a significantly low capacity, such as about "⅓" times, the first obtaining device can store and obtain the control information and the virtual reference information, and the second obtaining device can store and obtain the first control information.

In another aspect of the information recording apparatus of the present invention, the first converting device (i-1) does not convert one common information, which is common information to the control information and the virtual reference information, and the first control information, and (i-2) converts one difference information, which is different information from the control information and the virtual reference information, and the first control information, and the second converting device (ii-1) does not convert another common information, which is common information to the first control information and the second control information, and (ii-2) converts another difference information, which is different information from the first control information and the second control information.

According to this aspect, it is possible to further reduce the capacity of the memory required in converting the entire portion of the control information, such as e.g. UDF Virtual Partition, i.e. the latest standard file system, to the compatible file system, such as e.g. ISO/UDF Bridge file system, on the basis of one or another difference information.

In another aspect of the information recording apparatus of the present invention, the first converting device converts one portion of the control information and one portion of the virtual reference information to one portion of the first control information, and the first controlling device controls the recording device to sequentially record the converted one portion of the first control information.

According to this aspect, the conversion and recording processes are sequentially performed. Thus, it is possible to further reduce the capacity of the memory required in converting the entire portion of the control information, such as e.g. UDF Virtual Partition, i.e. the latest standard file system, to the compatible file system, such as e.g. ISO/UDF Bridge file system.

In another aspect of the information recording apparatus of the present invention, the first converting device converts an entire portion of the control information and an entire portion of the virtual reference information to an entire portion of the first control information, and the first controlling device controls the recording device to collectively record the converted entire portion of the first control information.

According to this aspect, the conversion and recording processes are collectively performed. Thus, it is possible to further reduce the capacity of the memory required in converting the entire portion of the control information, such as e.g. UDF Virtual Partition, i.e. the latest standard file system, to the compatible file system, such as e.g. ISO/UDF Bridge file system.

In another aspect of the information recording apparatus of the present invention, it is further provided with: a third obtaining device for obtaining the recorded second control information; a third converting device for converting the obtained second control information to third control information (ISO 9660) with the different attribute; and a third controlling device for controlling the recording device to record the converted third control information.

According to this aspect, the second control information is further obtained by the third obtaining device. Then, the further converted second control information, such as e.g. ISO 9660 Joliet extension file system, is converted on the same memory by the third converting device to the third control information, such as e.g. ISO 9660 file system, which is another element that constitutes the compatible file system. Simultaneously or in tandem with this, the converted third control information is written onto the information recording medium by the recording device under the control of the third controlling device.

As a result, it is possible to significantly reduce the capacity of the memory required in converting the entire portion of the control information, such as UDF Virtual Partition, to the compatible file system, such as ISO/UDF Bridge file system, which is provided with the plurality of file systems, such as ISO 9660 file system, ISO 9660 Joliet extension file system, and UDF 1.02 file system, to about "⅓" times, compared to the conventional method.

In an aspect associated with the second and third converting devices, the second converting device may convert the obtained first control information to the second control information which allows amount of data of a character code or the number of characters of identification information (a directory name and a file name), which constitutes a logical hierarchy (a directory structure and a file structure) corresponding to the address, to be reduced, and the third converting device may convert the obtained second control information to the third control information which allows the amount of data of the character code or the number of characters to be further reduced.

By virtue of such construction, by the second converting device, it may be also possible to perform one conversion process of converting the file system with relatively the largest amount of data, such as the number of characters, to the file system with relatively the second largest amount of data. By this, it is possible to judge in advance that following another conversion process, performed by the third converting device, can be performed in terms of the capacity of the memory, wherein another conversion process is to convert the file system with relatively the second largest amount of data to the file system with relatively the third largest amount of data, i.e. relatively the smallest file system.

Alternatively, by the second converting device, it may be also possible to perform one conversion process of converting the file system with relatively the largest amount of data in displaying the character code, to the file system with relatively the second largest amount of data. Specifically, it may be possible to perform the conversion process of converting the file system with the relatively large amount of data, which is Unicode or the like, with a character code of "00A" necessary in displaying alphabet "A", to the file system with the relatively small amount of data, which is Shift JIS or the like, with a character code of "A" necessary in displaying alphabet "A". As a result, it is also possible to judge in advance that following another conversion process, performed by the third converting device, can be performed in terms of the capacity of the memory, wherein another conversion process is to convert the file system with relatively the second largest amount of data to the file system with relatively the third largest amount of data, i.e. relatively the smallest file system.

In another aspect of the information recording apparatus of the present invention, each of the control information, the first control information, and the second control information includes management information for managing a recording position or a reproduction position in the recording area, in order to control the order of recording or reproducing.

According to this aspect, the first and second converting devices can perform the aforementioned conversion process on the basis of the management information.

(Information Recording Method)

Hereinafter, the information recording method of the present invention will be explained.

The above object of the present invention can be also achieved by information recording method in an information recording apparatus provided with a recording device for recording at least record information (contents) onto an information recording medium on which (i) control information (FS UDF-VAT) and (ii) virtual reference information (VAT) can be recorded, the control information capable of controlling order of recording or reproducing record information, the virtual reference information indicating a correlation between an address (physical or logical address) that indicates a position in a recording area in which the record information is recorded and a virtual address that can be specified by the control information, the information recording method provided with: a first obtaining process of obtaining the control information and the virtual reference information; a first converting process of converting the obtained control information and the obtained virtual reference information to first control information (one element of UDF Bridge: File System—UDF 1.02) which can control the order of recording or reproducing the record information on the basis of the address; a first controlling process of controlling the recording device to record the converted first control information; a second obtaining process of obtaining the recorded first control information; a second converting process of converting the obtained first control information to second control information (another element of UDF Bridge: File System—ISO 9660 Joliet and ISO 9660) with a different attribute (the number of characters and a character code); and a second controlling process of controlling the recording device to record the converted second control information.

According to the information recording method of the present invention, it is possible to receive various benefits of the aforementioned information recording apparatus of the present invention.

In response to the various aspects of the aforementioned information recording apparatus of the present invention, the information recording method of the present invention can employ various aspects.

(Computer Program)

Hereinafter, the computer program of the present invention will be explained.

The above object of the present invention can be also achieved by computer program for recording control and for controlling a computer provided in the aforementioned information recording apparatus of the present invention (including its various aspects), the computer program making the computer function as at least one portion of the first obtaining device, the first converting device, the recording device, the first controlling device, the second obtaining device, the second converting device, and the second controlling device.

According to the computer program of the present invention, the aforementioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned information recording apparatus of the present invention, the computer program of the present invention can also employ various aspects.

The above object of the present invention can be also achieved by a computer program product in a computer-readable medium for tangibly embodying a program of instructions executable by a computer provided in the aforementioned information recording apparatus of the present invention (including its various aspects), the computer program product making the computer function as at least one portion of the first obtaining device, the first converting device, the recording device, the first controlling device, the second obtaining device, the second converting device, and the second controlling device.

According to the computer program product of the present invention, the aforementioned information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus of the present invention.

These effects and other advantages of the present invention will become more apparent from the embodiments explained below.

As explained above, according to the information recording apparatus and method of the present invention, it is provided with the first obtaining device (or process), the first converting device (or process), the recording device, the first controlling device (or process), the second obtaining device (or process), the second converting device (or process), and the second controlling device (or process). As a result, it is possible to significantly reduce the capacity of the memory required in converting the entire portion of the control information, such as e.g. UDF Virtual Partition, i.e. the latest standard file system, to the compatible file system, such as ISO/UDF Bridge file system, which is provided with the plurality of file systems, such as ISO 9660 file system, ISO 9660 Joliet extension file system, and UDF 1.02 file system, to about "⅓" times, compared to the conventional method.

Moreover, according to the computer program of the present invention, it makes a computer function as the aforementioned information recording apparatus of the present invention. Thus, it is possible to significantly reduce the capacity of the memory required in converting the entire portion of the control information, such as e.g. UDF Virtual Partition, i.e. the latest standard file system, which is recorded on the aforementioned information recording medium, to the compatible file system, such as ISO/UDF Bridge file system, which is provided with the plurality of file systems, such as ISO 9660 file system, ISO 9660 Joliet extension file system, and UDF 1.02 file system, to about "⅓" times, compared to the conventional method.

BRIEF DESCRIPTION OF DRAWINGS

FIG. 1 is a substantial plan view showing the basic structure of an optical disc with a plurality of recording areas, which is an embodiment of the information recording medium of the present invention, and a conceptual view showing a recording area structure in its radial direction, corresponding to the substantial plan view.

FIG. 2 is a conceptual graph showing a relationship between a recording area on the optical disc in the embodiment of the information recording medium of the present invention and an address that can specify a position in the recording area.

FIG. 3 is a schematic diagram showing the data structure of the latest standard file system, such as UDF Virtual Partition, recorded in the recording area of the optical disc in the embodiment of the information recording medium of the present invention.

FIG. 4 is a block diagram showing the basic structures of an information recording/reproducing apparatus in an embodiment of the information recording apparatus of the present invention.

FIG. 5 is a conceptual view schematically showing a conversion principle of converting the latest standard file system, such as UDF Virtual Partition, to a compatible file system, such as ISO/UDF Bridge file system, which is provided, for example, with three file systems of ISO 9660 file system, ISO 9660 Joliet extension file system, and UDF 1.02 file system, in a comparison example.

FIG. 6 is a table showing the attributes of the three file systems, which constitutes the compatible file system, such as ISO/UDF Bridge file system, which is a general file system.

FIG. 7 is a schematic diagram conceptually comparing UDF Virtual Partition and UDF 1.02 file system, which are general file systems.

FIG. 8 is a schematic diagram conceptually showing a flow of an overall conversion process in the embodiment.

FIG. 9 is a schematic diagram conceptually showing one portion of the conversion process in the embodiment.

FIG. 10 is a schematic diagram conceptually showing another portion of the conversion process in the embodiment.

FIG. 11 is a schematic diagram conceptually showing another portion of the conversion process in the embodiment.

FIG. 12 is a schematic diagram conceptually showing the data structure of the plurality of file systems recorded on the information recording medium, as a result of the conversion process in the embodiment.

FIG. 13 are a schematic diagram conceptually showing a flow of the overall conversion process in the embodiment (FIG. 13(a)) and a schematic diagram conceptually showing a flow of the overall conversion process in the comparison example (FIG. 13(b)).

FIG. 14 is a schematic diagram conceptually showing a flow of an overall conversion process in another embodiment.

DESCRIPTION OF REFERENCE CODES

1 ... center hole, 10 ... track, 11 ... ECC block, 100 ... optical disc, 101 ... lead-in area, 102 ... data area, 103 ... lead-out area, 300 ... information distributing apparatus, 301 ... optical pickup, 302 ... signal recording/reproducing device, 303 ... address detection device, 305 ... CPU (drive control device), 306 ... spindle motor, 307 ... memory, 308 ... data input/output control device, 309 ... bus, 403 ... operation control device, 404 ... operation button, 405 ... display panel, CDZ ... control data zone, RMA ... recording management area, LB ... laser light

BEST MODE FOR CARRYING OUT THE INVENTION

Hereinafter, the best mode for carrying out the present invention will be explained in each embodiment in order with reference to the drawings.

(1) General Information Recording Medium in Embodiment

Next, with reference to FIG. 1 to FIG. 3, a detailed explanation will be given on an embodiment of an information recording medium (hereinafter referred to as the information recording medium of the present invention, as occasion demands) as a recording target of the information recording apparatus of the present invention.

(1-1) Basic Structure

Firstly, with reference to FIG. 1, the basic structure of an optical disc in an embodiment of the information recording medium of the present invention will be explained. FIG. 1 is a substantial plan view showing the basic structure of the optical disc with a plurality of recording areas, which is an embodiment of the information recording medium of the present invention, and a conceptual view showing a recording area structure in its radial direction, corresponding to the substantial plan view.

As shown in FIG. 1, an optical disc 100 has a recording surface on a disc main body with a diameter of about 12 cm, as is a DVD. On the recording surface, the optical disc 100 is provided with: a center hole 1 as the center; a recording management area RMA; a lead-in area 101; a data area 102; and a lead-out area 103, which are associated with the embodiment. Then, for example, on a not-illustrated transparent substrate of the optical disc 100, there is at least a recording layer laminated. In each recording area of the recording layers, for example, a track or tracks 50, such as groove tracks and land tracks, are alternately placed, spirally or concentrically, centered on the center hole 1. On the track 50, record information (data) is divided and recorded by a unit of ECC block 51. The ECC (Error Correction Code) block 51 is a record information management unit by which the record information is error-correctable.

Incidentally, the present invention is not particularly limited to the optical disc having these three areas. For example, even if the lead-in area 101 or the lead-out area 103 does not exist, a data structure explained below can be constructed. Moreover, as described later, the lead-in area 101 or the lead-out area 103 may be further segmentized.

(1-2) Detailed Structure

Next, with reference to FIG. 2 and FIG. 3, an explanation will be given on the detailed structure of the optical disc in the embodiment of the information recording medium of the present invention.

(1-2-1) Address that can Specify a Position in a Recording Area of the Optical Disc Firstly, with reference to FIG. 2, a relationship between the recording area on the optical disc and an address that can specify a position in the recording area will be explained. FIG. 2 is a conceptual graph showing the relationship between the recording area on the optical disc in the embodiment of the information recording medium of the present invention and the address that can specify a position in the recording area. Incidentally, the vertical axis in FIG. 2 indicates the value of an address, such as a LBA (Logical Block Address), and the horizontal axis indicates a relative position in the radial direction of the optical disc. Moreover, one specific example of the "address" of the present invention is constructed, for example, of the LBA, or a physical sector number (or sector number) which constitutes an ECC block.

As shown in FIG. 2, the recording area of the optical disc 100 in the embodiment of the information recording medium of the present invention is provided with: (i) the recording management area RMA, which is one specific example of a management area; (ii) the lead-in area 101 having a control data zone CDZ, which is another specific example of the management area; (iii) a data area 102a; and (vi) the lead-out area 103, from the inner circumferential side to the outer circumferential side. Incidentally, various management information may be recorded in the management area. Here, the management information is various information for managing the information recording medium, such as (i) information about recording features, such as an optimum recording power, (ii) attribute information for specifying the type of the medium, (iii) information for specifying a position in various recording layers, (iv) various file systems described later.

Moreover, as shown in FIG. 2, if one specific example of the address that can uniquely specify a position in the recording area of the aforementioned optical disc 100 is the LBA (Logical Block Address), the address in the recording area of the optical disc 100 may increase as an optical pickup is displaced from the inner circumferential side to the outer circumferential side (refer to a thick solid line in FIG. 2). Incidentally, in general, (i) in a LBA of "0", for example, there is recorded information about a character string which indicates the presence or absence of the file system itself, such as Windows File System, FAT File system, Unix File System, and MAC File System, and the address at which information (or content) about the file system itself is recorded. (ii) In a LBA of "16", there is recorded information about the presence or absence of the file system based on the ISO (International Organization for Standardization) standard. (iii) In a LBA of "256", for example, there is recorded information about the address in which the file system based on the ISO 1334 UDF standard is recorded. (iv) In a LBA of "512", for example, there is recorded information about the address in which the file system based on the UDF Virtual Partition described later is recorded.

(1-2-2) UDF Virtual Partition File System

Now, with reference to FIG. 3, an explanation will be given on the data structure of the information recording medium on which a general recording method is performed on the basis of the latest standard file system, such as UDF Virtual Partition, by a general information recording apparatus. FIG. 3 is a schematic diagram showing the data structure of the latest standard file system, such as UDF Virtual Partition, recorded in the recording area of the optical disc in the embodiment of the information recording medium of the present invention. Incidentally, "UD1" and "UD2" in FIG. 3 indicate file data, such as user data. "F0", "F1" and "F2" indicate file management information. "V0", "V1", and "V2" indicate VAT.

"VI0", "VI1", and "VI2" indicate VATICB. "LBA n" indicates a position in which the file data, such as user data, is recorded last.

As shown in a step S1 in FIG. 3, if the general recording method based on the file system of UDF Virtual Partition or the like is performed by the general information recording apparatus, firstly, the file data, such as user data, is recorded (refer to UD1 in FIG. 3). Then, the file management information described later (refer to F1 in FIG. 3) is recorded, including information about a recording position and information about the type of the recorded file data. Lastly, VAT (Virtual Allocation Table: refer to V1 in FIG. 3) and VATICB (VAT Information Control Block: refer to VI1 in FIG. 3) are recorded. Here, VAT, as explained later, is a table on which various pointer information for uniquely specifying the recording position is registered in UDF Virtual Partition in which various information is updated. VATICB indicates the recording position of VAT. An address that indicates the position of this VATICB, or the content itself recorded in VATICB, is recorded in a sector in which the file data is recorded last, i.e. the LBA with the maximum address (refer to LBA n in FIG. 3).

Substantially in the same manner, as shown in a step S2 in FIG. 3, if the general recording method based on the file system of UDF Virtual Partition or the like is performed by the general information recording apparatus, the file data, such as user data, is firstly recorded (refer to UD2 in FIG. 3). Then, the file management information described later (refer to F2 in FIG. 3) is recorded, including information about the recording position and information about the type of the recorded file data. Lastly, VAT (Virtual Allocation Table: refer to V2 in FIG. 3) and VATICB (VAT Information Control Block: refer to V12 in FIG. 3) are recorded. Incidentally, in the recording area with LBA of "0" to "511", Reserved RZone may be disposed at the head in order to provide an unrecorded state and provide the compatibility in the present invention, i.e. in order to record the file system which maintains the compatibility described later.

Since the file system of UDF Virtual Partition or the like is constructed in the above manner, a general information recording/reproducing apparatus, such as a player, firstly obtains the address that indicates the position of VATICB from the sector in which the file data is recorded last (refer to the aforementioned LBA n), and understands the position of VAT. Then, in reproducing the file data, the reproduction starts from the file management information F0, which is recorded in the position with the minimum LBA. The file management information (F0, F1, F2) includes so-called indirect pointer, which is the pointer information that indirectly indicates a position in which the file data is recorded, through VAT. With reference to VAT (refer to V0 in FIG. 3) in an updated portion of the file management information F0, the file management information F1 or F2 can be reproduced. The file management information F1 includes information about the file data UD1, and the file management information F21 includes information about the file data UD2. As a result, the general information recording/reproducing apparatus, such as a player, can reproduce the file data (UD1 and UD2).

(2) Information Recording Apparatus in Embodiment

Next, with reference to FIG. 4, the structure of an information recording apparatus in an embodiment of the present invention will be detailed. In particular, in this embodiment, the information recording apparatus of the present invention is applied to an information recording/reproducing apparatus for an optical disc.

(2-1) Basic Structure

Firstly, with reference to FIG. 4, an explanation will be given on the basic structure of an information recording/reproducing apparatus 300 in an embodiment of the information recording apparatus of the present invention. FIG. 4 is a block diagram showing the basic structures of the information recording/reproducing apparatus in the embodiment of the information recording apparatus of the present invention. Incidentally, the information recording/reproducing apparatus 300 has a function of recording record data onto the optical disc 100 and a function of reproducing the record data recorded on the optical disc 100.

With reference to FIG. 4, the internal structure of the information recording/reproducing apparatus 300 will be discussed. The information recording/reproducing apparatus 300 is an apparatus for recording information onto the optical disc 100 and reading the information recorded on the optical disc 100, under the control of a CPU (Central Processing Unit) 305 for drive.

The information recording/reproducing apparatus 300 is provided with: the optical disc 100; an optical pickup 301; a signal recording/reproducing device 302; an address detection device 303; the CPU (drive control device) 305; a spindle motor 306; a memory 307; a data input/output control device 308; a bus 309; an operation control device 403; an operation button 404; and a display panel 405.

In particular, the information recording/reproducing apparatus 300 may be constructed to communicate with an external network by containing a not-illustrated computer having a communication device, such as a modem, in the same housing. Alternatively, the CPU of the computer having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the CPU 305, upon an OPC process. In particular, the signal recording/reproducing device 302 constitutes one example of the "recording device", together with the optical pickup 301. Moreover, the signal recording/reproducing device 302 may be able to obtain the RMD recorded in the control data zone CDZ or the recording management area RMA0 (RMA1). Thus, the signal recording/reproducing device 302 may constitute one portion of the "reading device" of the present invention.

The address detection device 303 detects an address (or address information) on the optical disc 100 from a reproduction signal including a pre-format address signal or the like, which is outputted by the signal recording/reproducing device 302.

The CPU (drive control device) 305 controls the entire information recording/reproducing apparatus 300 by giving an instruction to various controlling devices, through the bus 309. Moreover, software or firmware for operating the CPU 305 is stored in the memory 307. In particular, the CPU 305 is one specific example of the "recording control device" or the "controlling device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the compatibility process in the present invention, the general data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The data input/output control device 308 controls the input/output of the data from the exterior with respect to the information recording/reproducing apparatus 300, to thereby perform storage to and export from the data buffer on the memory 307. A drive control command issued from an external computer connected to the information recording/reproducing apparatus 300 through an interface, such as a SCSI and an ATAPI, is transmitted to the CPU 305 through the data input/output control device 308. Moreover, the record/reproduction data is also transmitted and received with respect to the computer through the data input/output control device 308, in the same manner.

The operation control device 403 receives an operation instruction and performs display with respect to the information recording/reproducing apparatus 300, and transmits an instruction by the operation button 404, such as an instruction to record or reproduce, to the CPU 305. The CPU 305 may transmit a control command to the information recording/reproducing apparatus 300, on the basis of instruction information from the operation control device 403, to thereby control the entire information recording/reproducing apparatus 300. In the same manner, the CPU 305 can transmit a command for requesting the information recording/reproducing apparatus 300 to transmit an operational state to a host, with respect to the information recording/reproducing apparatus 300. By this, the operational state of the information recording/reproducing apparatus 300, such as during recording and during reproduction, can be recognized, so that the CPU 305 can output the operational state of the information recording/reproducing apparatus 300 to the display panel 405, such as a fluorescent tube and an LCD, through the operation control device 403.

One specific example which uses the information recording/reproducing apparatus 300, as explained above, is small-size electronic equipment and portable electronic equipment, such as a small-size digital camera.

(3) Conversion Principle in Information Recording Apparatus in Embodiment

Next, with reference to FIG. 5 to FIG. 13, an explanation will be given on a principle of converting to the compatible file system, such as a ISO/UDF Bridge file system, in the information recording apparatus in the embodiment. Incidentally, to make the explanation easy to understand, firstly, the conventional general principle of converting to the compatible file system will be explained (refer to "(3-1) General Conversion Principle"). Then, the details of the conversion principle in the embodiment will be explained (refer to "(3-2) Details of Conversion Principle in Embodiment"). Lastly, the operation and effect of the conversion principle in the embodiment will be studied (refer to "(3-3) Study of Operation and Effect of Conversion Principle in Embodiment").

(3-1) General Conversion Principle

Firstly, with reference to FIG. 5 to FIG. 7, the principle of converting to the compatible file system, for example, based on the conventional general principle will be explained FIG. 5 is a conceptual view schematically showing the conversion principle of converting the latest standard file system, such as UDF Virtual Partition, to a compatible file system, such as ISO/UDF Bridge file system, which is provided, for example, with three file systems of ISO 9660 file system, ISO 9660 Joliet extension file system, and UDF 1.02 file system, in a comparison example.

As shown in FIG. 5, in the conventional general method, for example, under the control of the CPU (Central Processing Unit), firstly, the latest standard file system, such as UDF Virtual Partition, is read from the optical disc. Simultaneously or in tandem with this, it is stored into the high-capacity memory (refer to a step S10$x$ in FIG. 5). Then, the latest standard file system recorded on the high-capacity memory is once converted to the compatible file system, such as ISO/UDF Bridge file system, which is provided, for example, with the three file systems of ISO 9660 file system, ISO 9660 Joliet extension file system, and UDF 1.02 file system (refer to a step S20$x$ in FIG. 5).

Now with reference to FIG. 6 and FIG. 7, an explanation will be given on the attributes of the three file systems of ISO 9660 file system, ISO 9660 Joliet extension file system, and UDF 1.02 file system, which constitute the compatible file system, such as ISO/UDF Bridge file system, which is a general file system. FIG. 6 is a table showing the attributes of the three file systems, which constitutes the compatible file system, such as ISO/UDF Bridge file system, which is the general file system. FIG. 7 is a schematic diagram conceptually comparing UDF Virtual Partition and UDF 1.02 file system, which are general file systems.

As shown in FIG. 6, UDF Virtual Partition, which is one specific example of the latest standard file system, and ISO 9660 file system, ISO 9660 Joliet extension file system, and UDF 1.02 file system, which are one and other specific examples of the constituent elements of the compatible file system, such as ISO/UDF Bridge file system, have different attributes about a character code and the number of characters or the like.

Specifically, UDF Virtual Partition, which is one specific example of the latest standard file system, has (i) a character code of "Unicode" for displaying a directory name or a file name, (ii) the number of characters of "127" for displaying the directory name or the file name, and (iii) the amount of data of about "255" bytes, which can be used to display the directory name or the file name, because one character needs two bytes.

On the other hand, UDF 1.02 file system, which is one specific example of the constituent elements of the compatible file system, has (i) a character code of "Unicode", (ii) the number of characters of "127", and (iii) the amount of data of about "255" bytes, which can be used to display the directory name or the file name. In particular, the aforementioned UDF Virtual Partition and UDF 1.02 file system have substantially the same attribute. Moreover, as shown in the upper part of FIG. 7, in UDF Virtual Partition, as described above, the position of the file management information (FS infor.) for managing the recording position or the reproduction position in the recording area corresponds to the position of the actual file data, such as content data, indirectly (i.e. on the basis of an Indirect method), through VAT (Virtual Allocation Table). On the other hand, as shown in the lower part of FIG. 7, in UDF 1.02 file system, the position of the file management information (FS infor.) for managing the recording position or the reproduction position in the recording area corresponds to the position of the actual file data, such as content data, directly (i.e. on the basis of a Direct method), in order to control the order in the recording or reproduction.

Back in FIG. 6 again, ISO 9660 Joliet extension file system, which is another specific example of the constituent elements of the compatible file system, has (i) a character code of "Unicode", (ii) the number of characters of "64", and (iii) the amount of data of about "128" bytes, which can be used to display the directory name or the file name. Moreover, ISO 9660 file system, which is another specific example of the constituent elements of the compatible file system, has (i) a character code of "Shift JIS", (ii) the number of characters of "15", and (iii) the amount of data of about "31" bytes, which can be used to display the directory name or the file name.

Back in FIG. 5 again, lastly, when the conversion of the entire latest standard file system is completed on the high-capacity memory, the compatible file system, such as ISO/UDF Bridge file system, is written onto the optical disc at a time (refer to a step S30x in FIG. 5), wherein the compatible file system is provided with the three file systems of ISO 9660 file system, ISO 9660 Joliet extension file system, and UDF 1.02 file system. Specifically, under the control of the CPU, this ISO/UDF Bridge file system is written from the position indicated by LBA n, backward. In addition, identification information, such as signature, which indicates the presence of ISO/UDF Bridge file system, and pointer information pointing to the file information of ISO/UDF Bridge file system are written in the recording area in an unrecorded state, which is reserved near LBA 0, under the control of the CPU.

As described above, in the conventional general method, all of the plurality of file systems are converted on the high-capacity memory and are written onto the optical disc. It is only necessary to perform the reading operation from the optical disc once, and it is also only necessary to perform the writing operation onto the optical disc once. Thus, it is possible to realize the quick conversion process. However, as its trade-off, the high-capacity memory is required. Specifically, for example, the memory with about 64 Mbytes to 128 Mbytes is required to convert the latest standard file system, such as UDF Virtual Partition of a DVD-R 4.7 GB, to the compatible file system, such as ISO/UDF Bridge file system, which is provided with the plurality of file systems, such as ISO 9660 file system, ISO 9660 Joliet extension file system, and UDF 1.02 file system. In particular, it is also noted that the aforementioned file management information (F0, F1, F2) are dispersed in UDF Virtual Partition, so that the reading takes a time and the high-capacity memory needs to be prepared. Thus, in Palm Top Type small-size electronic equipment or portable electronic equipment, it is technically hard to mount the high-capacity and small-size memory. In addition, if the high-capacity and small-size memory is mounted, cost will be increased. In the market, for example, if the high-capacity and small-size memory is mounted in the small-size electronic equipment or portable electronic, such as a small-size digital camera or a portable photo recorder/viewer, the mounted memory only has a recording capacity of e.g. about 16-32 Mbytes for the reasons of physical and structural restrictions or the like, such as an increase in price, an increase in power consumption for driving the high-capacity memory, and impossibility to ensure a space in which the high-capacity memory is mounted.

(3-2) Details of Conversion Process in Embodiment

Next, with reference to FIG. 8 to FIG. 12, the details of the conversion process in the embodiment will be discussed. FIG. 8 is a schematic diagram conceptually showing a flow of the overall conversion process in the embodiment. FIG. 9 is a schematic diagram conceptually showing one portion of the conversion process in the embodiment. FIG. 10 is a schematic diagram conceptually showing another portion of the conversion process in the embodiment. FIG. 11 is a schematic diagram conceptually showing another portion of the conversion process in the embodiment. FIG. 12 is a schematic diagram conceptually showing the data structure of the plurality of file systems recorded on the information recording medium, as a result of the conversion process in the embodiment.

As shown in FIG. 8, according to the conversion process in the embodiment, under the control of the controlling device, such as the CPU, the latest standard file system, such as UDF Virtual Partition, is not converted at a time to the entire compatible file system, such as ISO/UDF Bridge file system, but is converted by each of a plurality of portions and in a plurality of times in order, on the memory. And simultaneously each is written onto the optical disc.

That is, under the control of the controlling device, such as the CPU, as a first stage, UDF Virtual Partition is read and converted to UDF 1.02 file system on the memory, and the converted UDF 1.02 file system is written onto the optical disc (refer to a step S100 in FIG. 8). As a second stage, the written UDF 1.02 file system is converted to ISO 9660 Joliet extension file system on the same memory, and the converted ISO 9660 Joliet extension file system is written onto the optical disc (refer to a step S200 in FIG. 8). As a third stage, the written ISO 9660 Joliet extension file system is converted to ISO 9660 file system on the same memory, and the converted ISO 9660 file system is written onto the optical disc (refer to a step S300 in FIG. 8).

At the first stage, specifically as shown in FIG. 9, under the control of the controlling device, such as the CPU, UDF Virtual Partition written on the optical disc 100 is firstly read and stored into the memory (refer to a step S101 in FIG. 9). More specifically, for example, the optical disc, such as a DVD-R disc, is inserted into small-size electronic equipment, such as a PPR (Portable Photo Recorder/Viewer), and the compatibility process is started by a user's button operation. Then, on the memory, the latest standard file system, such as UDF Virtual Partition, is converted to another file system (i.e., first file system or first control information), such as UDF 1.02 file system, which is one element that constitutes the compatible file system (refer to a step S102 in FIG. 9). Simultaneously or in tandem with this, the converted first file system, such as UDF 1.02 file system, is written onto the optical disc (refer to a step S103 in FIG. 9). Incidentally, one specific example of the "control information" of the present invention is constructed of UDF Virtual Partition. Moreover, one specific example of the "first control information" of the present invention is constructed of UDF 1.02 file system.

In particular, as described above, UDF Virtual Partition and UDF 1.02 file system have a difference in whether the position of the file system (FS infor.) corresponds to the position of the actual file data, such as content data, (i) indirectly (i.e. on the basis of the Indirect method) through VAT (Virtual Allocation Table) or (ii) directly (i.e. on the basis of the Direct method). Therefore, as described above, after the entire pointer information that indicates the position of the file data through VAT in UDF Virtual Partition is converted at a time to the pointer information that indicates the file data in UDF 1.02 file system, it may be written onto the optical disc at a time, Alternatively, only one portion or a predetermined amount of portion of the pointer information that indicates the position of the file data through VAT in UDF Virtual Partition is sequentially converted to the pointer information that indicates the position of the file data in UDF 1.02 file system, it may be sequentially written onto the optical disc. As a result, it is possible to further receive an effect described later, and it is possible to further reduce the necessary capacity of the memory.

At the second stage, specifically as shown in FIG. 10, under the control of the controlling device, such as the CPU, the first file system, such as UDF 1.02 file system, written on the optical disc 100 at the first stage is read and stored into the memory (refer to a step S201 in FIG. 10). Then, on the same memory, it is converted to another file system (i.e., second file system or second control information), such as ISO 9660 Joliet extension file system, which is another element that constitutes the compatible file system, (refer to a step S202 in FIG. 10). Simultaneously or in tandem with this, the converted second file system, such as ISO 9660 Joliet extension file system, is written onto the optical disc (refer to a step S203 in FIG. 10). Incidentally, one specific example of the "second control information" of the present invention is constructed of ISO 9660 Joliet extension file system.

In particular, as shown in FIG. 12 described later, in the conversion of UDF 1.02 file system in which one file management information and one file data are continuously recorded (refer to UD+F in FIG. 12), to ISO 9660 Joliet extension file system (or ISO 9660 file system described later), the following effect can be received, compared to the conversion of UDF Virtual Partition in which a plurality of file management information and a plurality of file data are alternately recorded (refer to UD1+F1, UD2+F2, and UD3+F3 in FIG. 12), to ISO 9660 Joliet extension file system. That is, the conversion of UDF 1.02 file system, in which one file management information and one file data are continuously recorded, to ISO 9660 Joliet extension file system requires only one time reading of the file management information and the file data. In other words, a short-distance seek operation is only performed. Thus, it is possible to realize the quick reading operation, to thereby realize the quick conversion process.

In addition, as described above, the difference between UDF 1.02 file system and ISO 9660 Joliet extension file system is that they have the different numbers of characters as the attribute. Therefore, the conversion process may be performed if the lengths of the directory name or the file name in UDF 1.02 file system are out of the standard of ISO 9660 Joliet extension file system. Alternatively, as described above, after the entire UDF 1.02 file system is converted at a time to ISO 9660 Joliet extension file system with regard to the number of characters, it may be written onto the optical disc at a time. Alternatively, after only one portion or a predetermined amount of portion of UDF 1.02 file system is sequentially converted to ISO 9660 Joliet extension file system with regard to the number of characters, it may be sequentially written onto the optical disc. As a result, it is possible to further receive an effect described later, and it is possible to further reduce the necessary capacity of the memory.

Moreover, in addition, for example, it is also possible to perform one conversion process of converting the file system with relatively the largest amount of data, such as the number of characters, to the file system with relatively the second largest amount of data. By this, it is possible to judge in advance that following another conversion process can be performed in terms of the capacity of the memory, wherein another conversion process is to convert the file system with relatively the second largest amount of data to the file system with relatively the third largest amount of data, i.e. relatively the smallest file system.

Moreover, in addition, for example, it is also possible to perform one conversion process of converting the file system with relatively the largest amount of data in displaying the character code, to the file system with relatively the second largest amount of data. Specifically, it is possible to perform the conversion process of converting the file system with the relatively large amount of data, which is Unicode or the like, with a character code of "00A" necessary in displaying alphabet "A", to the file system with the relatively small amount of data, which is Shift JIS or the like, with a character code of "A" necessary in displaying alphabet "A". As a result, it is also possible to judge in advance that following another conversion process can be performed in terms of the capacity of the memory, wherein another conversion process is to convert the file system with relatively the second largest amount of data to the file system with relatively the third largest amount of data, i.e. relatively the smallest file system.

At the third stage, specifically as shown in FIG. 11, under the control of the controlling device, such as the CPU, the second file system, such as ISO 9660 Joliet extension file system, written on the optical disc 100 at the second stage is read and stored into the memory (refer to a step S301 in FIG. 11). Then, on the same memory, it is converted to another file system (i.e., third file system or third control information), such as ISO 9660 file system, which is another element that constitutes the compatible file system, (refer to a step S302 in FIG. 11). Simultaneously or in tandem with this, the converted third file system, such as ISO 9660 file system, is written onto the optical disc (refer to a step S303 in FIG. 11). Incidentally, one specific example of the "third control information" of the present invention is constructed of ISO 9660 file system.

In particular, as described above, the difference between ISO 9660 Joliet extension file system and ISO 9660 file system is that they have the different character codes as the attribute. Therefore, as described above, after the entire UDF 1.02 file system is converted at a time to ISO 9660 Joliet extension file system with regard to the character code, it may be written onto the optical disc at a time. Alternatively, only one portion or a predetermined amount of portion of UDF 1.02 file system is sequentially converted to ISO 9660 Joliet extension file system with regard to the character code, it may be sequentially written onto the optical disc. As a result, it is possible to further receive an effect described later, and it is possible to further reduce the necessary capacity of the memory.

As a result of the conversion processes at the first to third stages described above in the embodiment, as shown in FIG. 12, with regard to the data structure of the file system recorded on the information recording medium, there are established (i) UDF Virtual Partition in which the plurality of file systems (i.e., file management information) and the plurality of file data are alternately recorded, (ii) UDF 1.02 file system in which one file system and one file data are continuously recorded, (iii) ISO 9660 Joliet extension file system, and (iv) ISO 9660 file system, which are established in order from smaller LBA (Logical Block Address) to larger LBA.

As described above, in the embodiment, the file system before conversion and the file system after conversion are appropriately combined on the basis of various characteristics, such as the attribute and the data structure of various file systems, such as UDF Virtual Partition, and the conversion process is performed in appropriate order. As a result, it is possible to significantly reduce the capacity of the memory required in converting the entire latest standard file system, such as UDF Virtual Partition, to the compatible file system, such as ISO/UDF Bridge file system, which is provided with the plurality of file systems, such as ISO 9660 file system, ISO 9660 Joliet extension file system, and UDF 1.02 file system, to about "1/3" times, compared to the conventional method. Therefore, it is unnecessary to mount the high-capacity and small-size memory, so that it is possible to control the cost of the memory to be low. In other words, even in the commercially available small-size electronic equipment, such as a small-size digital camera, equipped only with the memory with a memory capacity of about 16-32 Mbytes, it is possible to sufficiently provide compatibility for the entire latest standard file system, such as UDF Virtual Partition by the conversion principle in the embodiment.

(3-3) Study of Operation and Effect of Conversion Principle in Information Recording Apparatus in Embodiment Next, with reference to FIG. 5 and FIG. 8 to FIG. 12, as occasion demands, in addition to FIG. 13, the operation and effect of the conversion principle in the information recording apparatus in the embodiment will be considered. FIG. 13 are a schematic diagram conceptually showing a flow of the overall conversion process in the embodiment (FIG. 13(a)) and a schematic diagram conceptually showing a flow of the overall conversion process in the comparison example (FIG. 13(b)).

As shown in FIG. 13(b) or FIG. 5, in the comparison example, all of the plurality of file systems are converted on the high-capacity memory and written onto the optical disc. It is only necessary to perform the reading operation from the optical disc once, and it is also only necessary to perform the writing operation onto the optical disc once. Thus, it is possible to realize the quick conversion process. However, as its trade-off, the high-capacity memory is required.

In contrary, in the embodiment, as shown in FIG. 13(a) and FIG. 8 to FIG. 12, for example, the file system before conversion and the file system after conversion are appropriately combined on the basis of various characteristics, such as the attribute or the data structure of various file systems, such as UDF Virtual Partition, and the conversion process is performed in appropriate order. As a result, it is possible to significantly reduce the capacity of the memory required in converting the entire latest standard file system, such as UDF Virtual Partition, to the compatible file system, such as ISO/UDF Bridge file system, to about "1/3" times, compared to the conventional method. Therefore, it is unnecessary to mount the high-capacity and small-size memory, so that it is possible to reduce the cost of the memory to be low. In other words, even in the commercially available small-size electronic equipment, such as a small-size digital camera, equipped only with the memory with a memory capacity of about 16-32 Mbytes, it is possible to sufficiently provide compatibility for the entire latest standard file system, such as UDF Virtual Partition by the conversion principle in the embodiment.

(4) Conversion Principle in Information Recording Apparatus in Another Embodiment Next, with reference to FIG. 14, an explanation will be given on the details of the conversion process in another embodiment. FIG. 14 is a schematic diagram conceptually showing a flow of the overall conversion process in another embodiment. Incidentally, substantially the same process as that in the aforementioned embodiment carries the same step number, and the explanation thereof will be omitted.

As shown in FIG. 14, according to conversion process in another embodiment, as described above, under the control of the controlling device, such as the CPU, as the first stage, UDF Virtual Partition is read, the UDF Virtual Partition is converted to UDF 1.02 file system (the aforementioned first file system), and the converted UDF 1.02 file system is written onto the optical disc (refer to a step S100 in FIG. 14). As the second stage, the written UDF 1.02 file system is converted to ISO 9660 Joliet extension file system (the aforementioned second file system) or ISO 9660 file system (the aforementioned third file system) on the same memory, and the converted ISO 9660 Joliet extension file system or ISO 9660 file system is written onto the optical disc 100 (refer to a step S200a in FIG. 14).

As a result, in another embodiment, the file system before conversion and the file system after conversion are appropriately combined on the basis of various characteristics, such as the attribute and the data structure of various file systems, such as UDF Virtual Partition, and the conversion process is performed in appropriate order and in more simple way.

Moreover, in the aforementioned embodiments, an explanation is given on the optical disc 100 as one example of the information recording medium and the recorder or player related to the optical disc as one example of the information recording apparatus; however, the present invention is not limited to the optical disc and the recorder or player for the optical disc, and it can be also applied to other various information recording media which support high-density recording or high transmission rate, and recorders or players for the various information recording media.

The present invention is not limited to the aforementioned embodiment, but various changes may be made, if desired, without departing from the essence or spirit of the invention which can be read from the claims and the entire specification. An information recording apparatus and method, and a computer program for recording control, all of which involve such changes, are also intended to be within the technical scope of the present invention.

INDUSTRIAL APPLICABILITY

The information recording apparatus and method, and the computer program according to the present invention can be applied to an information recording apparatus, such as a DVD recorder. Moreover, they can be applied to a recording apparatus or the like which is mounted on various computer equipment for consumer use or for commercial use, or which can be connected to various computer equipment.

The invention claimed is:

1. An information recording apparatus for performing recording on an information recording medium on which (i) control information and (ii) virtual reference information is recorded, the control information capable of controlling order of recording or reproducing record information, the virtual reference information indicating a correlation between an address that indicates a position in a recording area in which the record information is recorded and a virtual address that is specified by the control information, said information recording apparatus comprising:

a first obtaining device for obtaining the control information and the virtual reference information;

a first converting device for converting the obtained control information and the obtained virtual reference information to first control information which controls the order of recording or reproducing the record information on the basis of the address;

a recording device for recording at least the record information;

a first controlling device for controlling said recording device to record the first control information;

a second obtaining device for obtaining the recorded first control information;

a second converting device for converting the obtained first control information to second control information with a different attribute; and a second controlling device for controlling said recording device to record the second control information.

2. The information recording apparatus according to claim 1, wherein each of said first obtaining device and said second obtaining device further comprises a memory device for storing the obtained information.

3. The information recording apparatus according to claim 1, wherein said first converting device (i-1) does not convert one common information, which is common information to the control information and the virtual reference information, and the first control information, and (i-2) converts one difference information, which is different information from the control information and the virtual reference information, and the first control information, and said second converting device (ii-1) does not convert another common information, which is common information to the first control information and the second control information, and (ii-2) converts another difference information, which is different information from the first control information and the second control information.

4. The information recording apparatus according to claim 1, wherein said first converting device converts one portion of the control information and one portion of the virtual reference information to one portion of the first control information, and said first controlling device controls said recording device to sequentially record the one portion of the first control information.

5. The information recording apparatus according to claim 1, wherein said first converting device converts an entire portion of the control information and an entire portion of the virtual reference information to an entire portion of the first control information, and said first controlling device controls said recording device to collectively record the entire portion of the first control information.

6. The information recording apparatus according to claim 1, further comprising:

a third obtaining device for obtaining the recorded second control information;

a third converting device for converting the obtained second control information to third control information with the different attribute; and a third controlling device for controlling said recording device to record the third control information.

7. The information recording apparatus according to claim 6, wherein said second converting device converts the obtained first control information to the second control information which allows amount of data of a character code or the number of characters of identification information, which constitutes a logical hierarchy corresponding to the address, to be reduced, and said third converting device converts the obtained second control information to the third control information which allows the amount of data of the character code or the number of characters to be further reduced.

8. The information recording apparatus according to claim 1, wherein each of the control information, the first control information, and the second control information includes management information for managing a recording position or a reproduction position in the recording area, in order to control the order of recording or reproducing.

9. An information recording method in an information recording apparatus comprising a recording device for recording at least record information onto an information recording medium on which (i) control information and (ii) virtual reference information is recorded, the control information capable of controlling order of recording or reproducing record information, the virtual reference information indicating a correlation between an address that indicates a position in a recording area in which the record information is recorded and a virtual address that is specified by the control information, said information recording method comprising:

a first obtaining process of obtaining the control information and the virtual reference information;

a first converting process of converting the obtained control information and the obtained virtual reference information to first control information which controls the order of recording or reproducing the record information on the basis of the address;

a first controlling process of controlling said recording device to record the first control information;

a second obtaining process of obtaining the recorded first control information;

a second converting process of converting the obtained first control information to second control information with a different attribute; and a second controlling process of controlling said recording device to record the second control information.

* * * * *